United States Patent
Gold et al.

(10) Patent No.: US 6,652,703 B2
(45) Date of Patent: Nov. 25, 2003

(54) METHOD FOR BONDING A CARRIER PLATE TO A VEHICLE WINDOW

(75) Inventors: Kurt Gold, Herrenberg (DE); Susanne Hauser, Neustetten (DE); Walter Prokisch, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 79 days.

(21) Appl. No.: 09/809,424

(22) Filed: Mar. 16, 2001

(65) Prior Publication Data

US 2001/0039990 A1 Nov. 15, 2001

(30) Foreign Application Priority Data

Mar. 16, 2000 (DE) .......................................... 100 12 977

(51) Int. Cl.[7] ............................................... B32B 31/20
(52) U.S. Cl. .................... 156/299; 156/286; 156/583.1; 156/295
(58) Field of Search .................... 156/285–286, 156/295, 297, 299, 552, 556, 566, 583.1

(56) References Cited

U.S. PATENT DOCUMENTS

| 4,927,479 A | * | 5/1990 | Bock | 156/228 |
| 5,262,640 A | | 11/1993 | Purvis et al. | |
| 5,284,538 A | * | 2/1994 | Suzuki et al. | 156/154 |
| 5,494,546 A | * | 2/1996 | Horvath | 100/295 |

FOREIGN PATENT DOCUMENTS

| WO | 96/21568 | 7/1996 |

\* cited by examiner

Primary Examiner—Jeff H. Aftergut
Assistant Examiner—Jessica Rossi
(74) Attorney, Agent, or Firm—Crowell & Moring LLP

(57) ABSTRACT

A method for bonding a sensor carrier plate having an adhesive layer to a vehicle window includes heating the adhesive layer by a heating device and pressing the carrier plate against the vehicle window for a predetermined time by a contact-pressure device. To reduce the risk of air inclusions between the adhesive layer and the vehicle window, the contact-pressure device initially brings the carrier plate with its adhesive layer into point or linear contact with the vehicle window and then, immediately after this, into extended-area contact with the vehicle window until full contact is achieved.

25 Claims, 2 Drawing Sheets

METHOD FOR BONDING A CARRIER PLATE TO A VEHICLE WINDOW

BACKGROUND AND SUMMARY OF INVENTION

This application claims the priority of German patent document No. 100 129 77.3-43, filed Mar. 16, 2001, the disclosure of which is expressly incorporated by reference herein.

The present invention relates to a method for bonding a sensor carrier plate to a vehicle window, in particular the windscreen of a passenger car or lorry. The present invention furthermore relates to an apparatus and its use for carrying out the above-mentioned method.

On modern passenger cars, a sensor array may be mounted on the windscreen, comprising, for example, a light sensor, a rain sensor, and a distance sensor. For this purpose, the sensor array or its components are mounted on at least one carrier plate that is secured on the windscreen by an adhesive joint. The carrier plate is provided on one side with an adhesive layer, which can be formed by a corresponding adhesive strip, for example. The adhesive layer must first of all be heated to form an adhesive joint with the windscreen. To prevent contamination of this adhesive layer, it is provided with a protective film that must be removed before the carrier plate is bonded to the windscreen. For the proper functioning of the optical sensor array, it is critical that the light path should not be obstructed by the carrier plate being bonded to the windscreen. In particular, craters, blisters, air inclusions and dirt in the adhesive layer and between the adhesive layer and the windscreen must therefore be avoided.

The conventional procedure for bonding a carrier plate is as follows. A carrier plate is taken manually from a storage bin and inserted into a furnace. In this furnace, the carrier plate and thus its adhesive layer are heated until the adhesive layer is sufficiently soft for bonding. The carrier plate is then removed manually from the furnace. The protective film must then be removed manually, after which the carrier plate is placed in a receptacle of a contact-pressure device. Finally, this contact-pressure device presses the carrier plate with its adhesive layer against the vehicle window for a predetermined time. The carrier plate is aligned parallel with the vehicle window before being pressed on, and is moved perpendicularly towards the vehicle window, with the result that the carrier plate and its adhesive layer come into full planar contact with the vehicle window, i.e. simultaneously by means of the entire adhesive layer.

Blisters may form in the adhesive layer even while heating is taking place in the furnace. Craters may form in the adhesive layer as the protective film is pulled off. Finally, air inclusions may occur as the carrier plate is brought into contact with the vehicle window. Overall, therefore, there is the risk that the light path through the adhesive layer will be obstructed and, as a result, it may be necessary to carry out expensive finishing work.

The present invention is concerned with the problem of designing a method such that the risk of an impaired light path through the adhesive layer is reduced.

The present invention is based on the general idea of bringing the carrier plate into contact with the vehicle window in a carefully controlled manner in such a way that the carrier plate with its adhesive layer is initially brought into point or linear contact with the vehicle window and only then into extended-area contact with the vehicle window, rather than being brought into contact in one plane. In this way, the air between the carrier plate and the vehicle window is displaced as the carrier plate is applied or brought into contact. The risk of air inclusions between the adhesive layer and the vehicle window is thereby reduced.

Contact is preferably made by a tilting movement and/or rolling movement between the carrier plate and the vehicle window, thereby reinforcing the above-mentioned displacement effect.

A further improvement is obtained in that an area of contact formed at the start of contact-making increases continuously in the direction of an outer edge surrounding the adhesive layer as contact making progresses. There is therefore a smooth transition between the point or linear initial contact and increasing extended-area contact and full, final contact over an extended area.

To improve a smooth transition between the point or linear initial contact and the full final contact over an extended area, the carrier plate and hence the adhesive layer can be bent reversibly in a convex manner towards the vehicle window for the purpose of making contact and bent back in the course of contact making. This ensures that the area of contact increases continuously in the course of contact making, rather than abruptly.

The heating of the adhesive layer by an appropriate heating device is expediently performed when the carrier plate is already in the contact-pressure device. This measure enables the method to be automated, thereby allowing the uniformity of the bonding process and hence its quality and reproducibility to be increased.

It is particularly advantageous if, before contact is made by the carrier plate with its adhesive layer, a vacuum is generated between the adhesive layer and the vehicle window. By this measure, air inclusions, which may form despite the special method of contact-making, are reduced in size by the ambient pressure prevailing after bonding. Given a vacuum of, for example, 200 mbar, the air inclusions shrink under ambient pressure to about ⅕ of their original extent. The method is preferably carried out at a vacuum of 10 mbar, as a result of which air inclusions are reduced under ambient pressure to about ¹⁄₁₀₀ of their extent and are then generally so small as to be tolerable.

The problem underlying the present invention is also solved by an apparatus designed in such a way that the carrier plate with its adhesive layer initially comes into point or linear contact with the vehicle window. Immediately after this, the adhesive layer comes into extended-area contact with the vehicle window until full contact has been achieved. As described above, this reduces the risk of air inclusions while the carrier plate is being brought into contact with the vehicle window.

According to a preferred embodiment, a holding device, which holds fast the vehicle window to be provided with the carrier plate; a heating device, which heats the carrier plate, at least in the area of its adhesive layer; and a contact-pressure device, which has a receptacle for the carrier plate to be bonded to the vehicle window, can be mounted on a common stand. At least the receptacle of the contact-pressure device is mounted on the stand in such a way that it can be moved between a heating position and a contact-pressure position. The receptacle interacts in its heating position with the heating device to heat the adhesive layer of the carrier plate held therein. The receptacle interacts in its contact-pressure position with the holding device to press the carrier plate against the vehicle window. By virtue of the construction proposed, the apparatus is particularly suitable for automation of the bonding process, thereby simplifying the use of this bonding process in the context of large-scale manufacture.

It is self-evident that the features mentioned above and those that are mentioned below can be used not only in the respectively indicated combination but also in different combinations or alone without departing from the scope of the present invention.

Other objects, advantages and novel features of the present invention will become apparent from the following detailed description of the invention when considered in conjunction with the accompanying drawing.

DETAILED DESCRIPTION OF DRAWINGS

Figure 1:
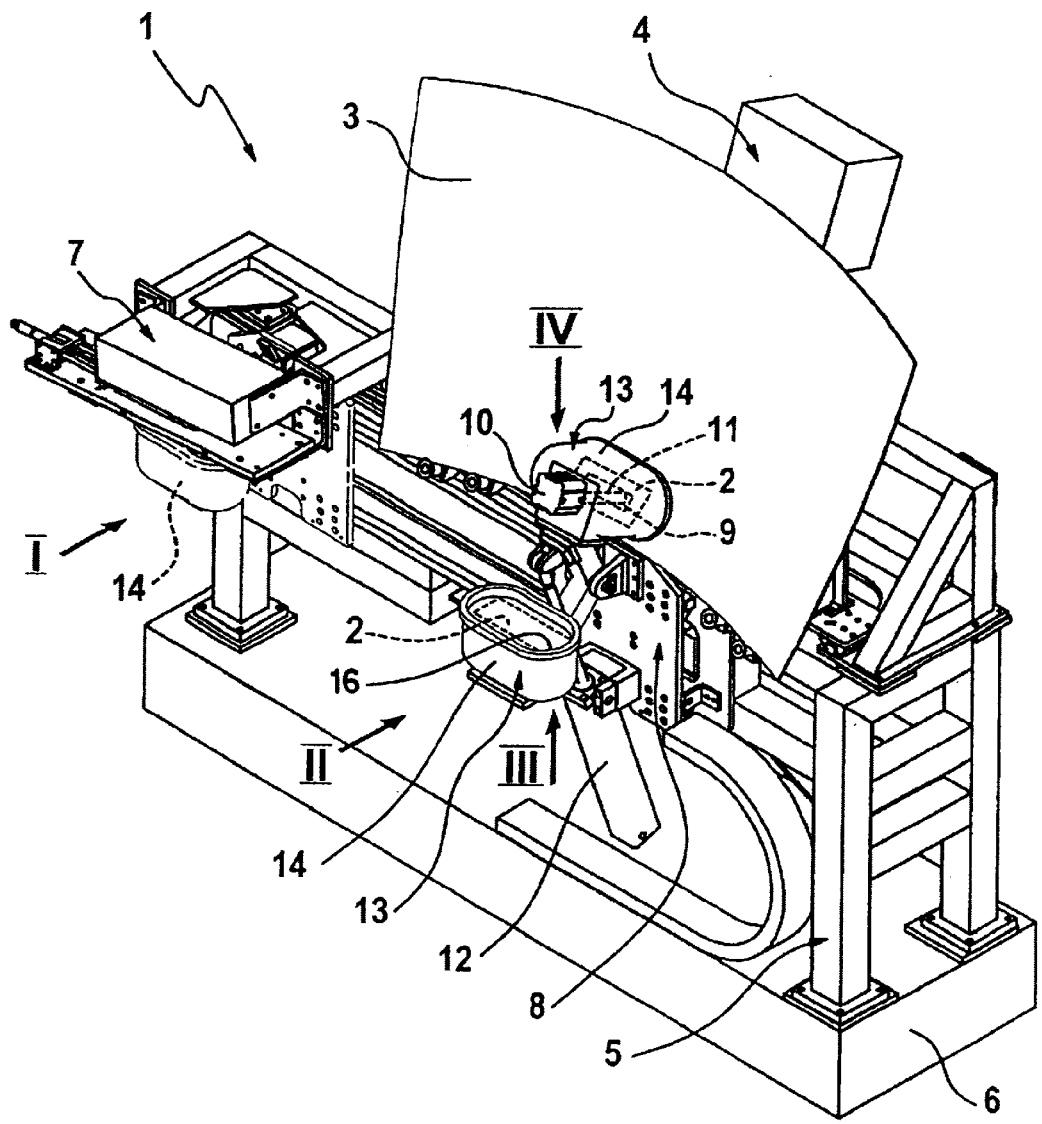
FIG. 1 shows a perspective view of an apparatus for bonding a sensor carrier plate to a vehicle window in accordance with the present invention.

As shown in FIG. 1, an apparatus 1 for bonding a sensor carrier plate 2 to a vehicle window 3, which is preferably a windscreen of a passenger car or lorry, has a holding device 4, which is used to hold the vehicle window 3 fast while it is provided with the carrier plate 2. The carrier plate 2 is illustrated in broken lines.

The apparatus 1 has a stand 5, which is mounted on a lifting table or base 6 and on which the holding device 4 is arranged. The lifting table or base 6 can be vertically adjustable, in particular by hydraulic means. The stand 5 furthermore has a heating device 7, with the aid of which the carrier plate 2 can be heated at least in the area of its adhesive layer. The heating device 7 preferably operates with infrared rays, allowing controlled heating of the adhesive layer to be achieved within a short time. By placing the carrier plate 2 at a relatively short distance from the source of radiation, particularly intense heating can be achieved. Transfer of heat energy over a relatively short distance by infrared rays is referred to as the close-range infrared technique.

The stand 5 has a contact-pressure device 8, which has a receptacle 9 illustrated in broken lines, which holds the carrier plate 2 fast for application to the vehicle window 3. The contact-pressure device 8 furthermore has a contact-pressure unit 10, which interacts with the receptacle 9 and thus with the carrier plate 2 via a contact-pressure member 11.

The contact-pressure arrangement 8 is configured in such a way that at least its receptacle 9 is mounted on the stand 5 in such a way as to be adjustable, more specifically between (1) a heating position I, in which the receptacle interacts with the heating device 7 to heat the adhesive layer of the carrier plate 2 held therein, and (2) a contact-pressure position II, in which the receptacle interacts with the holding device 4 to press the carrier plate 2 against the vehicle window 3. In this contact-pressure position II, the receptacle 9 can furthermore be adjusted between a loading position III and a working position IV by a corresponding actuating drive 12. For this purpose, the holding device 4 has a rotary drive that allows pivoting adjustment through about 180° in the plane of the window.

The apparatus 1 furthermore has a vacuum-generating device 13, which has a first vacuum bell 14 and a second vacuum bell 15. The first vacuum bell 14 contains the receptacle 9, the carrier plate 2 held therein, and the contact-pressure member 11 of the contact-pressure unit 10. The first vacuum bell 14 is thus integrated into the contact-pressure device 8, and, in the embodiment illustrated here, the first contact-pressure bell 14 with the elements mounted on it, e.g. the contact-pressure unit 10, and the elements contained therein, can be adjusted between the heating position I and the contact-pressure position II and between the loading position III and the working position IV.

Figure 2:
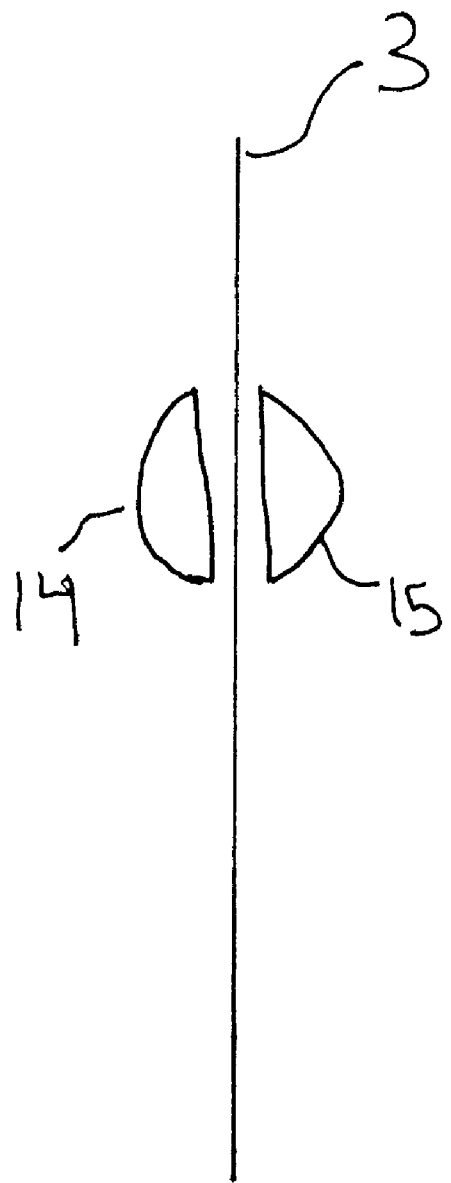
FIG. 2 shows a diagrammatic view of the apparatus having two vacuum bells.

While the first vacuum bell 14 is arranged on the same side of the vehicle window 3 as the observer, the second vacuum bell 15 is on the opposite side of the vehicle window 3 from the observer (FIG. 2). The structure of the second vacuum bell 15 corresponds to that of the first vacuum bell 14 at least to the extent that its opening is designed to be essentially congruent with an opening 16 of the first vacuum bell 14. In the working position IV, the first vacuum bell 14 comes to rest in a sealed manner with its opening against the side of the vehicle window 3 that faces the observer, the second vacuum bell 15 also rests in a sealed manner with its opening against the opposite side of the vehicle window 3 from the observer, the openings of the vacuum bells preferably being positioned so as to be congruent with one another. The vacuum is expediently applied simultaneously and uniformly to the bells, with the result that essentially no forces act on the vehicle window 3 during the application of the vacuum.

The method according to the present invention operates as follows:

The receptacle 9 is in its contact-pressure position II and in its loading position III, allowing a carrier plate 2 to be inserted manually into the receptacle 9. The carrier plate 2 can already have been preheated. Any protective film that has been applied to the adhesive layer of the carrier plate 2 can be removed manually. The receptacle 9 is moved into its heating position I, preferably automatically. In this position, the heating device 7 heats the carrier plate 2 and the adhesive layer. Heating takes place over a predetermined heating time or until a predetermined heating temperature is reached.

Once the heating operation is complete, the receptacle 9 is returned to its contact-pressure position II, preferably automatically, and transferred from its loading position III to its working position IV, likewise preferably automatically. In the working position IV, the vacuum bells rest in a sealed manner against the vehicle window 3, on both sides of the vehicle window 3. A vacuum is produced in the vacuum bells, the pressure being less than 200 mbar, preferably about 10 mbar. As soon as the vacuum-generating device 13 has generated a sufficient vacuum in the vacuum bells, the contact-pressure unit 10 is actuated to press the carrier plate 2 with its adhesive layer against the vehicle window 3. According to the present invention, the carrier plate 2 is pressed on or brought into contact by its adhesive layer in such a way that the adhesive layer of the carrier plate 2 initially comes into point or line contact with the vehicle window 3 and, immediately afterwards, comes into contact with the vehicle window 3 over an extended area until full contact has been achieved. This full contact over an extended area is then maintained for a predetermined contact-pressure time by a predetermined contact force.

Air is then readmitted to the vacuum bells, the contact-pressure unit 10 is returned to its initial state, and the receptacle 9 is transferred to its loading position III. The vehicle window 3, which is now fitted with the carrier plate 2, can be replaced by a vehicle window 3 without a carrier plate.

The procedure for bringing the carrier plate 2 into contact with the vehicle window 3 can, for example, be such that the adhesive layer of the carrier plate 2 first of all comes into contact with the vehicle window 3 at an outer edge surrounding the adhesive layer. Depending on the geometry of this outer edge and of the adhesive layer, this initial contact can be in the form of a point at one corner or in the form of a line along one side. In the course of contact making, the contact-pressure unit 10 is actuated in such a way that directly after initial contact (i.e. without lifting), point contact becomes linear contact and linear contact becomes contact over an extended area. The transition between linear contact and contact over an extended area is preferably designed in such a way, by appropriate actuation of the contact-pressure unit 10, that an area of contact between the adhesive layer and the vehicle window 3 increases continuously, rather than abruptly. This can be accomplished, for example, by a tilting movement, a rolling movement, or a squeezing movement. This is an effective way of reducing the risk of air inclusions between the adhesive layer and the vehicle window 3.

The contact-pressure unit 10 and the contact-pressure device 8 are designed to implement these specific kinematics. For example, a corresponding drive and/or a suitable bearing arrangement for the receptacle 9 can be provided.

In another embodiment, the contact-pressure device 8 can also be designed in such a way that the carrier plate 2 is bent reversibly within the limits of its flexibility before its adhesive layer is brought into contact with the vehicle window 3, such that the adhesive layer assumes a convex curvature towards the vehicle window 3. The adhesive layer is then brought into initial contact with the vehicle window 3 in the region of a vertex of this convex curvature. When the carrier plate 2 is bent back in an appropriate manner, there is a smooth transition between a linear contact zone and an extended-area contact zone, the area of contact increasing continuously until the adhesive layer is in full contact with the vehicle window 3.

Since the method can be automated with the apparatus 1 shown here, the heating time and/or the heating temperature can be optimized since the automatic processes that take place after this always remain the same. With the aid of the apparatus 1 according to the present invention, it is accordingly possible to achieve reliable reproducibility and high quality in the bonding of the carrier plate 2 to the vehicle window 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for bonding a sensor carrier plate to a vehicle window, comprising:
   heating a sensor carrier plate at least in an area of an adhesive layer;
   bringing the sensor carrier plate with the heated adhesive layer into point or linear contact with the vehicle window by actuating a contact-pressure unit to move a receptacle which holds the sensor carrier plate to a first orientation; and
   immediately pressing the adhesive layer into an extended-area contact with the vehicle window until full contact is achieved by actuating the contact pressure unit to move the receptacle to a second orientation.

2. A method according to claim 1, wherein the vehicle window is a windscreen of a passenger car or lorry.

3. A method according to claim 1, wherein the pressing comprises at least one of a tilting movement or a rolling movement between the carrier plate and the vehicle window, starting with point or linear initial contact and continuing until full, final contact over an extended area is achieved.

4. A method according to claim 1, wherein an area of contact between the heated adhesive layer and the vehicle window increases continuously in a direction of an outer edge surrounding the adhesive layer.

5. A method according to claim 1, wherein the heating of the adhesive layer is by a heating device.

6. A method according to claim 5, wherein the heating is performed when the carrier plate is in a receptacle of the contact-pressure device.

7. A method according to claim 1, further comprising generating a vacuum between the heated adhesive layer and the vehicle window before contact.

8. A method according to claim 7, wherein a pressure of the vacuum is less than 200 mbar.

9. A method according to claim 7, wherein a pressure of the vacuum is less than 100 mbar.

10. A method according to claim 7, wherein a pressure of the vacuum is less than 50 mbar.

11. A method according to claim 7, wherein a pressure of the vacuum is less than 20 mbar.

12. A method according to claim 7, wherein a pressure of the vacuum is less than 10 mbar.

13. A method according to claim 7, wherein a pressure of the vacuum is about 10 mbar.

14. A method for bonding a sensor carrier plate to a vehicle window, comprising:
   heating a sensor carrier plate at least in an area of an adhesive layer;
   bringing the sensor carrier plate with the heated adhesive layer into point or linear contact with the vehicle window via a contact-pressure device; and
   immediately pressing the adhesive layer into an extended-area contact with the vehicle window until full contact is achieved;
   wherein the heating of the adhesive layer is by a heating device and wherein the heating is performed when the carrier plate is in a receptacle of the contact-pressure device.

15. A method according to claim 14, wherein the vehicle window is a windscreen of a passenger car or lorry.

16. A method according to claim 14, wherein the pressing comprises at least one of a tilting movement or a rolling movement between the carrier plate and the vehicle window, starting with point or linear initial contact and continuing until full, final contact over an extended area is achieved.

17. A method according to claim 14, wherein an area of contact between the heated adhesive layer and the vehicle window increases continuously in a direction of an outer edge surrounding the adhesive layer.

18. A method according to claim 14, comprising bending the carrier plate in a reversible convex manner towards the vehicle window and bending the carrier plate back to an initial position during pressing.

19. A method according to claim 14, further comprising generating a vacuum between the heated adhesive layer and the vehicle window before contact.

20. A method according to claim 19, wherein a pressure of the vacuum is less than 200 mbar.

21. A method according to claim 19, wherein a pressure of the vacuum is less than 100 mbar.

22. A method according to claim 19, wherein a pressure of the vacuum is less than 50 mbar.

23. A method according to claim 19, wherein a pressure of the vacuum is less than 20 mbar.

24. A method according to claim 19, wherein a pressure of the vacuum is less than 10 mbar.

25. A method according to claim 19, wherein a pressure of the vacuum is about 10 mbar.

* * * * *